(12) United States Patent
Sakai

(10) Patent No.: US 7,085,030 B2
(45) Date of Patent: Aug. 1, 2006

(54) OPTICAL SCANNER DRIVING APPARATUS AND OPTICAL SCANNER DRIVING METHOD

(75) Inventor: Nobuaki Sakai, Hachioji (JP)

(73) Assignee: Olympus Corporation, Tokyo (JP)

( * ) Notice: Subject to any disclaimer, the term of this patent is extended or adjusted under 35 U.S.C. 154(b) by 951 days.

(21) Appl. No.: 10/103,311

(22) Filed: Mar. 21, 2002

(65) Prior Publication Data
US 2002/0163675 A1     Nov. 7, 2002

(30) Foreign Application Priority Data
Mar. 22, 2001   (JP)   ............................. 2001-082594

(51) Int. Cl.
*G02B 26/08*   (2006.01)

(52) U.S. Cl. ...................... 359/199; 359/213; 359/214; 359/223; 359/224

(58) Field of Classification Search ...................... None
See application file for complete search history.

(56) References Cited

U.S. PATENT DOCUMENTS 5,606,447 A    2/1997  Asada et al.
6,188,504 B1*  2/2001  Murakami et al. .......... 359/224
6,775,039 B1*  8/2004  Sakai ......................... 359/198
6,838,661 B1*  1/2005  Klement ..................... 250/234

FOREIGN PATENT DOCUMENTS

JP          10-207973      8/1998

* cited by examiner

Primary Examiner—James Phan
(74) Attorney, Agent, or Firm—Scully, Scott, Murphy & Presser, P.C.

(57) ABSTRACT

An optical scanner driving apparatus comprises a moving plate having a reflection plane and a driving coil, a magnetic field generating section arranged in a vicinity of the moving plate, a driving circuit to supply a driving signal to the driving coil, a first output acquiring section to acquire an output containing an electromotive force generated in the driving coil by an electromagnetic induction, a second output acquiring section comprising an impedance element having a corresponding impedance to an impedance of the driving coil, to acquire an output generated by the impedance element by supplying the driving signal to the impedance element, and a control circuit to control a state of the torsional vibration of the moving plate according to the electromotive force generated in the driving coil on the basis of the outputs acquired by the first output acquiring section and the second output acquiring section.

9 Claims, 5 Drawing Sheets

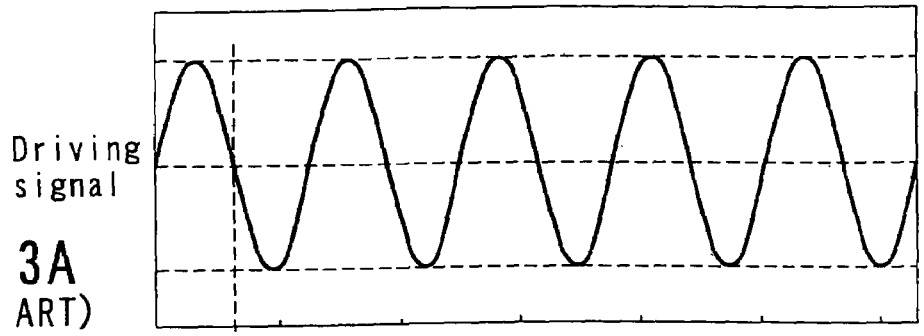
FIG. 3A (PRIOR ART) Driving signal
FIG. 3B (PRIOR ART) Vibration of optical scanner
FIG. 3C (PRIOR ART) Sensing signal
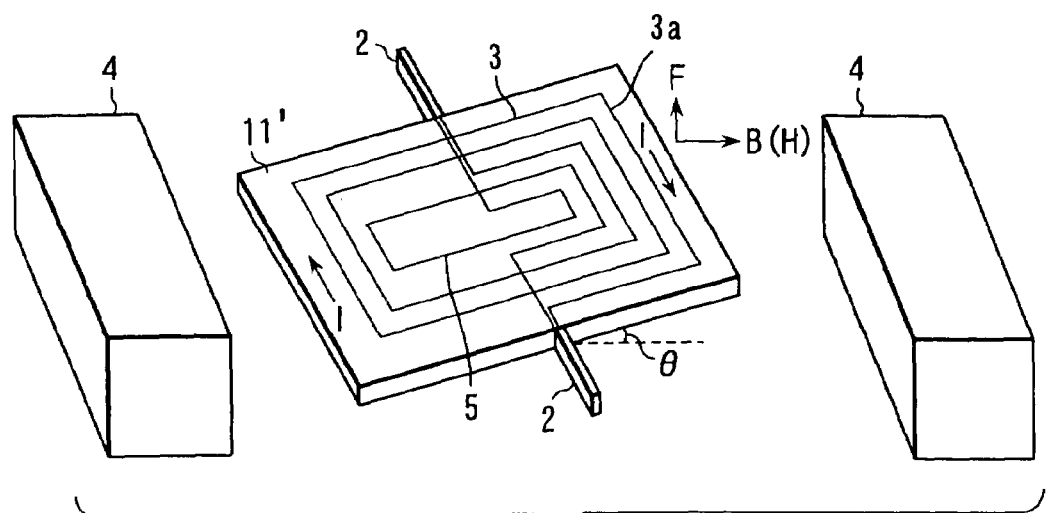
FIG. 4 (PRIOR ART)

OPTICAL SCANNER DRIVING APPARATUS AND OPTICAL SCANNER DRIVING METHOD

CROSS-REFERENCE TO RELATED APPLICATIONS

This application is based upon and claims the benefit of priority from the prior Japanese Patent Application No. 2001-082594, filed Mar. 22, 2001, the entire contents of which are incorporated herein by reference.

BACKGROUND OF THE INVENTION

1. Field of the Invention

This invention relates to an optical scanner driving apparatus and an optical scanner driving method of driving an optical scanner which scans a light from a light source one-dimensionally or two-dimensionally.

2. Description of the Related Art

There are generally known optical scanners that are prepared based on semiconductor manufacturing technologies for scanning a light from a light source one-dimensionally or two-dimensionally (see U.S. Pat. No. 5,606,447 and U.S. Pat. No. 6,188,504). These scanners are characterized by compactness and low profile.

FIG. 1 illustrates a principle of an optical scanner. Referring to FIG. 1, a moving plate 1 having a side to be used as a mirror has a thin rectangularly parallelepipedic profile. A pair of spring sections (elastic members) 2 made of metal or a semiconductor material are arranged respectively at middle positions of the longitudinal edges thereof. A coil pattern (to be referred to as "driving coil" hereinafter) 3 is arranged on the back side of the moving plate 1. A pair of permanent magnets 4 is arranged opposing to the respective lateral edges of the moving plate 1. The permanent magnets 4 generate a magnetic field having a component running in a direction (B) perpendicular to the wiring section 3a of the driving coil 3 that is parallel with the lateral edges of the moving plate 1.

As an AC current having a driving frequency f flows through the driving coil 3 of an optical scanner having the configuration as described above, a magnetic field of the permanent magnets 4 generates a force according to the Fleming's left hand rule in a direction perpendicular to the major surfaces of the moving plate 1. The magnetic field of the permanent magnets 4 is generated perpendicular to the direction of the electric current flowing in the wiring section 3a. Then, the moving plate 1 vibrates around the spring sections 2 operating as rotary axis with a frequency of f due to the generated force and the resilient force of the spring sections 2. If the AC current I is expressed by I=I₀ sin(2πft), the intensity of the magnetic field is H (magnetic flux density B), the number of turns of the driving coil 3 is N, the area of the driving coil 3 is S and the magnetic permeability in vacuum is μ₀, the scan angle θ and the generated torque F are defined by the equation (1) below:

$$F = \mu_0 NHSI_0 \sin(2\pi ft) \cdot \cos\theta \quad (1)$$

In the equation (1), the scan angle θ can be determined by solving the equation of motion (2) below:

$$J\ddot{\theta} = -k\theta - C\dot{\theta} + F \quad (2)$$

where k is the spring constant of the spring sections 2, C is the damping coefficient and J is the moment of inertia of the optical scanner. If the mechanical resonance frequency of the optical scanner is fc, k is expressed by equation k=J·(2π·fc)².

Meanwhile, if the scan angle θ is small and cos θ≈1 can be assumed, the relationship between the scan angle θ and the driving frequency f of the AC current I is expressed by equation (3) below by using the above equations (1) and (2):

$$\theta(f) = \frac{\mu_0 NHSI_0}{J} \sqrt{\frac{1}{\{k-(2\pi f)^2\}^2 + B^2 \cdot (2\pi f)^2}} \quad (3)$$

FIG. 2A shows the frequency response characteristics relative to the scan angle θ determined by the above equation (3). FIG. 2B shows the frequency response characteristics relative to a phase difference between the scan angle θ and the driving signal. In FIG. 2A, the vertical axis indicates the scan angle θ and the horizontal axis indicates the driving frequency f. In FIG. 2B, on the other hand, the vertical axis indicates the phase difference θ and the horizontal axis indicates the driving frequency f. From FIG. 2A, it can be seen that a large scan angle θ (resonance amplitude) can be obtained by making the driving frequency f correspond to the mechanical resonance frequency fc. Therefore, it is a common practice to make the driving frequency f of the AC current I and the mechanical resonance frequency fc correspond to each other when driving the moving plate 1. Note that, as shown in FIG. 3B, the phase of the scan angle θ (equivalent to the vibration of the moving plate 1) of the moving plate 1 delays by 90° relative to that of the driving signal (or the AC current I) shown in FIG. 3A.

The state of vibration of the moving plate 1 needs to be monitored constantly in order to stably drive the optical scanner. Therefore, the moving plate 1 is provided with a sensor for detecting the state of vibration of the scanner. Such a sensor is disclosed, for example, in U.S. Pat. No. 6,188,504. The sensor disclosed in this patent document has a configuration as shown in FIG. 4. On the surface of the moving plate 11', a coil pattern (to be referred to as a "sensing coil" hereinafter) 5 that differs from the driving coil 3 is arranged. An electromotive force is generated by linking the magnetic field of the permanent magnets 4 with the sensing coil 5 when the moving plate 11' vibrates. The electromotive force Vr generated in the sensing coil 5 is defined by the equation (4) below:

$$Vr = N_S BS_S \cdot d\theta/dt \cdot \cos\theta \quad (4),$$

where $N_S$ is the number of turns of the sensing coil 5, B is the magnetic flux density and $S_S$ is the area of the sensing coil 5.

If the driving signal (i.e., the AC current I) applied to the optical scanner is I=I₀ sin(2πf_C·t) in the above arrangement, a phase of the vibration of the optical scanner delays by 90° for the driving signal. Therefore, the above equation can be replaced by θ=-θ₀ cos(2πf_C·t). Then, if the scan angle θ (θ₀) is small, the electromotive force expressed by the equation (4) can be approximated by the equation (5) below.

$$Vr = N_S BS_s \theta_0 2\pi f_c \sin(2\pi f_c t)\cos\{-\theta_0 \cos(2\pi f_c t)\} \approx N_S BS_s \theta_0 2\pi f_c \sin(2\pi f_c t) \quad (5)$$

Therefore, as shown in FIG. 3C, the phase of the electromotive force (or the sensing signal) generated in the sensing coil 5 advances by 90° with reference to that of the vibration of the moving plate 11' shown in FIG. 3B. Note that the sign of the electromotive force is inverted and the phase of the electromotive force delays by 90° when the connections of the opposite ends of the sensing coil 5 are switched. In this specification, however, it is assumed that the phase of the electromotive force advances by 90°. The phase difference is always 90° regardless of the driving frequency. Thus, driving the optical scanner based on the resonance frequency provides phase relationships as illustrated in FIGS. 3A through 3C among the driving signal, the vibration of the moving plate 11', and the electromotive force (sensing signal) of the sensing coil. The phase of the driving signal corresponds to that of the sensing signal.

FIG. 5 shows an example of the driving apparatus as described above. A moving plate 11 has a driving coil 11a and a sensing coil 11b. When an operation controller such as a personal computer (not shown) supplies a control circuit 12 with a control signal indicating specification values for the vibration amplitude (scan angle) and the vibration frequency of the moving plate 11, the control circuit 12 outputs a driving reference signal to the driving circuit 13 according to the control signal. The driving circuit 13 outputs a driving signal to the driving coil 11a according to the driving reference signal. As a result, the moving plate 11 vibrates with a predetermined scan angle and a predetermined vibration frequency. At this time, an electromotive force (sensing signal) is generated at both ends of the sensing coil 11b by the electromagnetic induction caused by the linkage between the sensing coil 11b and the magnetic field. From the equation (5), it is possible to assume that the sensing signal has an amplitude proportional to the vibration frequency and the scan angle of the moving plate 11 and forms a sinusoidal wave having the same frequency as the vibration frequency. The sensing signal is transmitted to the control circuit 12 by way of a detection circuit 14. The control circuit 12 monitors the sensing signal and corrects the driving reference signal output to the driving circuit 13 when the vibration amplitude (scan angle) and the vibration frequency of the moving plate 11 deviate from respective predetermined values. In this way, the moving plate 11 is controlled based on the sensing signal.

The above-mentioned optical scanner driving apparatus requires the sensing coil 11b to be arranged along with the driving coil 11a on the same surface of the moving plate 11. Then, the area and the number of turns of the driving coil 11a are limited, reducing the drive efficiency of the optical scanner. While this problem may be avoided by using the large moving plate 11, the large moving plate 11 reduces the resonance frequency. Then, the scope of application of such an optical scanner will become limited. Further, the manufacturing process will become complicated, reducing the reliability and increasing the manufacturing cost. A sensor other than the sensing coil may be introduced. However, such a sensor may be costly and necessitate a cumbersome operation of regulating the alignment with the optical scanner.

To solve the above identified problem, for example, there is disclosed a driving circuit to detect an angular velocity zero moment of the vibration mirror and start an oscillation pulse (Japanese Patent Application KOKAI Publication No. 10-207973). However, this method cannot continuously control the vibration amplitude and the vibration frequency. The high-precision control is unavailable.

BRIEF SUMMARY OF THE INVENTION

The object of the present invention is to provide an optical scanner driving apparatus and an optical scanner driving method that can accurately control the vibration amplitude and the vibration frequency of the moving plate without requiring the use of a specifically designed sensor.

An optical scanner driving apparatus according to a first aspect of the present invention, is characterized by comprising: a moving plate having a reflection plane and comprising a driving coil integrally formed therewith; a magnetic field generating section arranged in a vicinity of the moving plate; a driving circuit configured to supply a driving signal to the driving coil, the moving plate performing a torsional vibration by the driving signal; first output acquiring means for acquiring an output containing an electromotive force generated in the driving coil by an electromagnetic induction on the basis of the magnetic field generated by the magnetic field generating section and the torsional vibration of the driving coil; second output acquiring means comprising an impedance element having a corresponding impedance to an impedance of the driving coil, for acquiring an output generated by the impedance element by supplying the driving signal to the impedance element; and a control section configured to control a state of the torsional vibration of the moving plate according to the electromotive force generated in the driving coil on the basis of the output acquired by the first output acquiring means and the output acquired by the second output acquiring means.

In the optical scanner driving apparatus according to the first aspect of the present invention, preferred manners are as follows. Any of the following manners may be used independently or in combination with the others.

(1) A support member which supports the moving plate; and an elastic member which connects the moving plate with the support are further provided.

(2) A differential amplifier configured to receive an output of the first output acquiring means and an output of the second output acquiring means, obtain a difference therebetween and output a difference to the control circuit is further provided.

(3) The control section controls the vibration amplitude of the moving plate according to the difference between an externally given amplitude reference value and an amplitude of the electromotive force.

(4) The control section includes a PI circuit configured to amplify a difference between an amplitude reference value and an amplitude of the electromotive force, and a gain control circuit configured to control a vibration amplitude of the moving plate according to an amplified difference output from the PI circuit.

(5) The control section includes a phase shift circuit configured to coincide a phase of the driving signal supplied to the driving coil with a phase of the electromotive force.

An optical scanner driving method of driving a optical scanner comprising a driving coil and a moving plate supported with free vibration according to a second aspect of the present invention, is characterized by comprising: supplying a driving signal to the driving coil; acquiring a first output containing an electromotive force generated in the driving coil by an electromagnetic induction caused by a drive of the driving coil; supplying the driving signal to an impedance element corresponding to the driving coil; acquiring a second output generated in the impedance element; detecting the electromotive force generated in the driving coil on the basis of the first output and the second output; and controlling the driving signal supplied to the driving coil according to a detected electromotive force.

An optical scanner driving apparatus according to a third aspect of the present invention, is characterized by comprising: an optical scanner comprising a moving plate having a reflection plane and comprising a driving coil integrally formed therewith, a support member configured to support the moving plate, an elastic member configured to connect the moving plate and the support member, and a magnetic field generating section arranged in a vicinity of the moving plate; a driving circuit configured to supply a driving signal to the driving coil, the moving plate performing a torsional vibration according to the driving signal; first output acquiring means for acquiring an output containing an electromotive force generated in the driving coil by an electromagnetic induction on the basis of the magnetic field generated by the magnetic field generating section and the torsional vibration of the driving coil; second output acquiring means comprising an impedance element having a corresponding impedance to an impedance of the driving coil, for acquiring an output generated by the impedance element by supplying the driving signal to the impedance element; and control means for controlling a state of the torsional vibration of the moving plate according to the electromotive force generated in the driving coil on the basis of the output acquired by the first output acquiring means and the output acquired by the second output acquiring means.

In the optical scanner driving apparatus according to the third aspect of the present invention, preferred manners are as follows. Any of the following manners may be used independently or in combination with the others.

(1) The control means controls the vibration amplitude of the moving plate according to the difference between an externally given amplitude reference value and an amplitude of the electromotive force.

(2) The control means controls a vibration frequency of the moving plate by a phase shift control which coincides a phase of the driving signal supplied to the driving coil with a phase of the electromotive force.

An optical scanner driving method of driving an optical scanner comprising a moving plate on which a driving coil is formed, a support member and an elastic member according to a fourth aspect of the present invention, is characterized by comprising: supplying a driving signal to the driving coil; acquiring a first output containing an electromotive force generated in the driving coil by an electromagnetic induction caused by a drive of the driving coil; supplying the driving signal to an impedance element corresponding to the driving coil; acquiring a second output generated in the impedance element; detecting the electromotive force generated in the driving coil on the basis of the first output and the second output; and controlling the driving signal supplied to the driving coil according to a detected electromotive force.

A driving and sensing circuit applied to an electromagnetic driving optical scanner comprising a support member, a moving plate on which a driving coil is formed, an elastic member connecting the support member and the moving plate, and a magnetic field generating section arranged in opposite to the moving plate, according to a fifth aspect of the present invention, is characterized by comprising: a first acquiring circuit configured to acquire a voltage difference between both ends of the driving coil; an impedance element which corresponds to the driving coil; a second acquiring circuit configured to acquire a voltage difference between both ends of the impedance element; and a difference detection circuit configured to obtain a difference between an output from the first acquiring circuit and the second acquiring circuit. With this configuration, it is preferable that a control circuit configured to feedback an output from the difference detection circuit to a driving circuit for the driving coil is further provided.

A detection method applied to an electromagnetic driving optical scanner comprising a support member, a moving plate on which a driving coil is formed, an elastic member connecting the support member and the moving plate, and a magnetic field generating section arranged in opposite to the moving plate, according to a sixth aspect of the present invention, is characterized by comprising: acquiring a first voltage difference between both ends of the driving coil; acquiring a second voltage difference between both ends of the impedance element which corresponds to a resistance of the driving coil; and obtaining a difference between the first voltage difference and the second voltage difference.

Each aspect of the present invention makes it possible to extract the electromotive force generated by the electromagnetic induction of the driving coil of the moving plate and control the driving signal supplied to the driving coil according to the extracted force. Therefore, no external sensor is needed for accurately controlling the vibration amplitude and the vibration frequency of the moving plate.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitutes a part of the specification, illustrates presently preferred embodiments of the present invention, and together with the general description given above and the detailed description of the preferred embodiments given below, serve to explain the principles of the present invention.

FIGS. 3A to 3C are graphs illustrating the relationships among the driving signal, the scan angle and the sensing signal of an optical scanner at resonance;

FIG. 4 is a schematic perspective view of a known optical scanner;

DETAILED DESCRIPTION OF THE INVENTION

Hereinafter, the present invention will be described referring to the accompanying drawings.

FIRST EMBODIMENT

Figure 1:
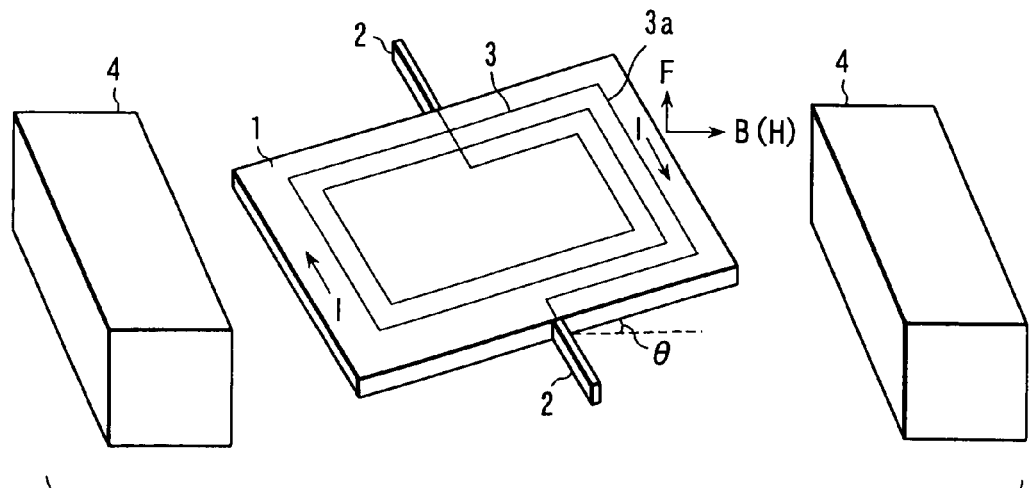
FIG. 1 is a schematic perspective view illustrating a configuration of an optical scanner.
Figure 2A:
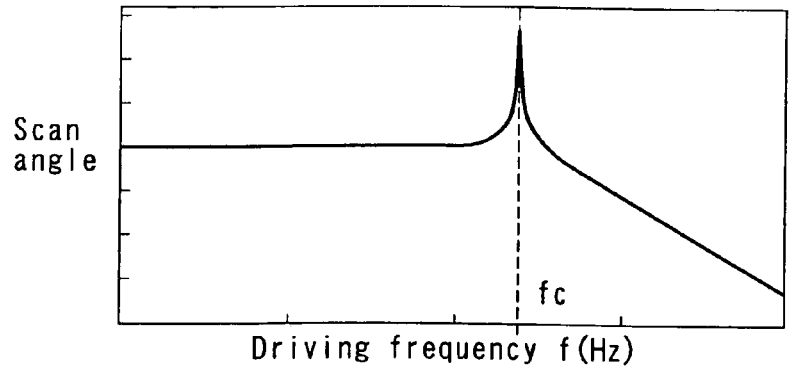
FIGS. 2A and 2B are graphs illustrating the relationships between an amplitude and phase of the scan angle and the driving frequency of an optical scanner.
Figure 2B:
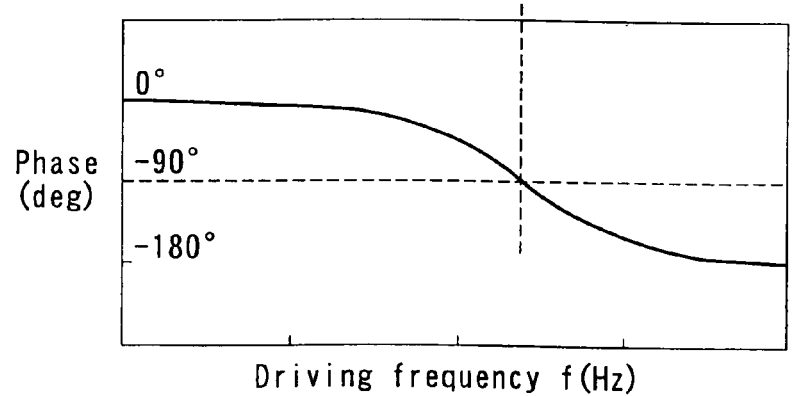
Figure 6:
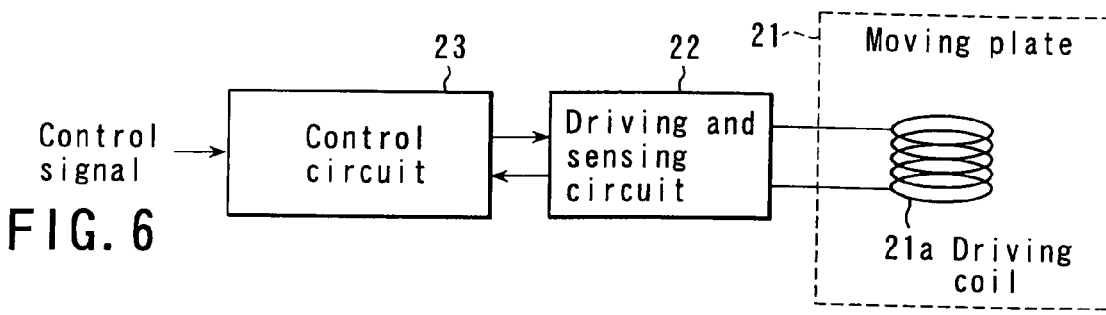
FIG. 6 is a schematic block diagram of an optical scanner driving apparatus according to a first embodiment of the present invention.

FIG. 6 schematically shows a configuration of an optical scanner driving apparatus according to the present invention. Referring to FIG. 6, a moving plate of an optical scanner has substantially the same configuration as the moving plate 1 shown in FIG. 1 and hence will not be illustrated nor described any further.

The first embodiment of optical scanner driving circuit according to the present invention comprises a control circuit 23 and a driving and sensing circuit 22. As shown in FIG. 6, a driving coil 21a is connected to the driving and sensing circuit 22. The control circuit 23 is connected to the driving and sensing circuit 22.

The operation of optical scanner driving circuit will be described referring to FIGS. 6 through 8.

An operation controller such as a personal computer (not shown) supplies the control circuit 23 with a control signal showing reference values of the vibration amplitude (scan angle) and the vibration frequency of the moving plate 21. The control circuit 23 outputs a driving reference signal to the driving and sensing circuit 22 according to the control signal. The driving and sensing circuit 22 by turn outputs a driving signal to the driving coil 21a according to the driving reference signal from the control circuit 23. As a result, the moving plate 21 vibrates with a predetermined scan angle and a predetermined vibration frequency.

When the moving plate 21 vibrates, the driving coil 21a, at its both ends, links with the magnetic field of the permanent magnets (or electromagnets, although not shown). As a result, the electromagnetic induction generates an electromotive force (sensing signal). The generated sensing signal is then transmitted to the control circuit 23 via the driving and sensing circuit 22. The control circuit 23 monitors the sensing signal. Whenever the vibration amplitude (scan angle) and the vibration frequency of the moving plate 21 deviate from the predetermined respective values, the control circuit 23 corrects the driving reference signal to be output to the driving and sensing circuit 22. As a result, it is possible to control the scan angle and the vibration frequency of the moving plate 21 according to the sensing signal from the driving coil 21a.

Figure 7:
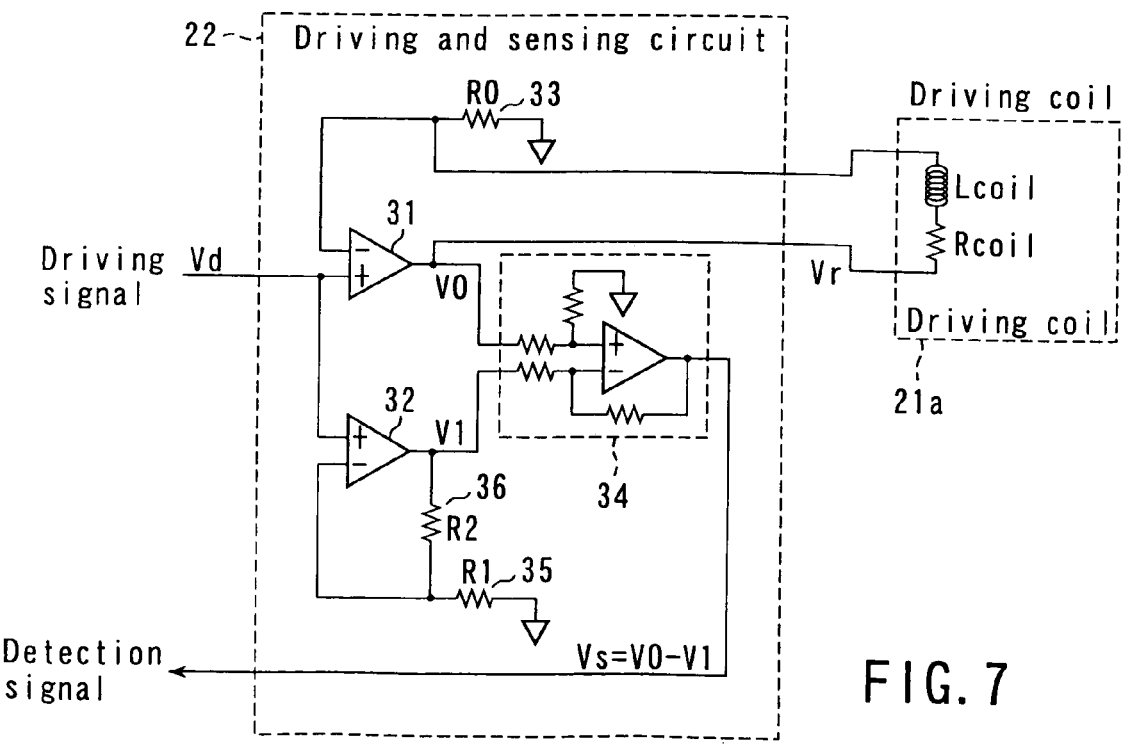
FIG. 7 is a schematic circuit diagram of a driving and sensing circuit used for the first embodiment.

FIG. 7 is a schematic circuit diagram of the driving and sensing circuit 22 of the optical scanner driving circuit according to the first embodiment.

Basically, the driving and sensing circuit 22 comprises a first amplifier 31, a second amplifier 32 and a resistance element 36.

Referring to FIG. 7, the driving signal (alternative voltage) $V_d$ of the control circuit 23 is applied to a positive input terminal of the first amplifier 31 and that of the second amplifier 32.

The first amplifier 31 operates as a first output acquiring means. A negative input terminal of the first amplifier 31 connects with a resistance element 33 whose resistance is $R_0$. The driving coil 21a (an equivalent circuit 21a of the driving coil in FIG. 7) of the moving plate 21 is connected between an output terminal of the first amplifier 31 and a connection point between the negative input terminal and the resistance element 33. In FIG. 7, the driving coil 21a is represented by an equivalent circuit, i.e., a series circuit comprising a coil having inductance $L_{coil}$ and a resistance element having resistance of $R_{coil}$. Assume that the inductance $L_{coil}$ is negligible relative to the resistance $R_{coil}$. The output terminal of the first amplifier 31 is connected to one of the input terminals (positive input terminal in FIG. 7) of a differential amplifier 34.

The second amplifier 32 operates as a second output acquiring means. A resistance element 35 with resistance $R_1$ is connected to the negative input terminal of the second amplifier 32. A resistance element 36 with resistance $R_2$ is connected as an impedance element between the output terminal of the second amplifier 32 and the connection point between the negative input terminal of the second amplifier 32 and the resistance element 35. The resistance element 36 has a resistance equivalent to the resistance $R_{coil}$ of the driving coil 21a. The output terminal of the second amplifier 32 is connected to the other input terminal of the differential amplifier 34.

The differential amplifier 34 operates as electromotive force detection means. The differential amplifier 34 outputs a detection signal $V_s$, i.e., a difference output $V_0 - V_1$ between the output $V_0$ of the first amplifier 31 and the output $V_1$ of the second amplifier 32.

With the above described arrangement, the control circuit 23 supplies the first amplifier 31 with the driving signal $V_d$. In response to the driving signal $V_d$, the first amplifier 31 supplies an electric current having a current value of $V_d/R_0$ to the driving coil 21a of the moving plate 21. Then, a potential difference is generated at both ends of the driving coil 21a. The potential difference is equal to the sum of $(R_{coil}/R_0) V_d$ and the electromotive force (sensing signal) $V_r$ generated when the driving coil 21a links with the magnetic field. Therefore, the output $V_0$ of the first amplifier 31 is expressed by the equation (6) below.

$$V_0 = V_d + \frac{R_{coil}}{R_0} V_d + V_r \tag{6}$$

On the other hand, when the driving signal $V_d$ receives the second amplifier 32, it supplies an electric current having a current value of $V_d/R_1$ to the resistance element 36. Then, a voltage of $(R_2/R_1) V_d$ is generated at both ends of the resistance element 36. Therefore, the output $V_1$ of the first amplifier 31 is expressed by the following equation (7).

$$V_1 = V_d + \frac{R_2}{R_1} V_d \tag{7}$$

The output $V_0$ of the first amplifier 31 and the output $V_1$ of the second amplifier 32 are then output to the differential amplifier 34. The differential amplifier 34 outputs a difference of the outputs, or $V_0 - V_1$, as a detection signal $V_S$. From the above equations (6) and (7), the detection signal $V_S$ is expressed by the following equation (8).

$$V_s = V_0 - V_1 = \left(\frac{R_{coil}}{R_0} - \frac{R_2}{R_1}\right) V_d + V_r \tag{8}$$

The first term of the right side of the equation (8) can be cancelled if resistances $R_1$ and $R_2$ of the resistance elements 35 and 36 are so selected as to make $(R_{coil}/R_0) = (R_2/R_1)$.

Figure 5:
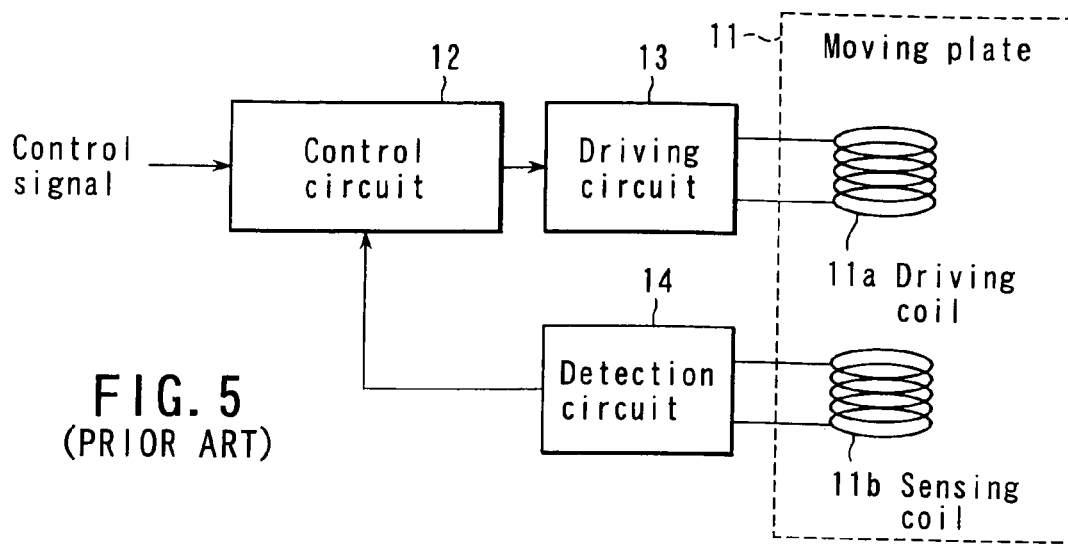
FIG. 5 is a schematic block diagram illustrating a configuration example of a known optical scanner driving apparatus.

Then, the differential amplifier 34 can detect the electromotive force (sensing signal) $V_r$ of the driving coil 21a. Only with the exception of the different detection sensitivity, the electromotive force (sensing signal) $V_r$ detected by the driving and sensing circuit 22 shown in FIG. 7 can be handled almost the same as the electromotive force of the sensing coil in FIG. 5.

The above description assumes the inductance $L_{coil}$ of the driving coil 21a to be negligible. If it is not negligible, its influence can be cancelled by connecting an extra coil having the same inductance to the resistance element 36 in series. In this case, however, the resistance of the extra coil is added to the resistance of the resistance element 36. Therefore, when an extra coil is connected to the resistance element 36 in series, the circuit needs to be so configured as to eliminate the influence of the resistance of the extra coil.

If the temperature coefficients of the resistors differ from each other, it is expected that an error is generated when the temperature changes. However, assuming that the temperature coefficients of the driving coil 21a and the resistance elements 33, 35 and 36 are $\alpha_{coil}$, $\alpha_0$, $\alpha_1$ and $\alpha_2$ respectively, the influence of a temperature change can be cancelled by selecting the resistance elements so as to satisfy the equation (9) for them.

$$\frac{R_{coil}(1+\alpha_{coil})}{R_0(1+\alpha_0)} = \frac{R_2(1+\alpha_2)}{R_1(1+\alpha_1)} \quad (9)$$

Figure 8:
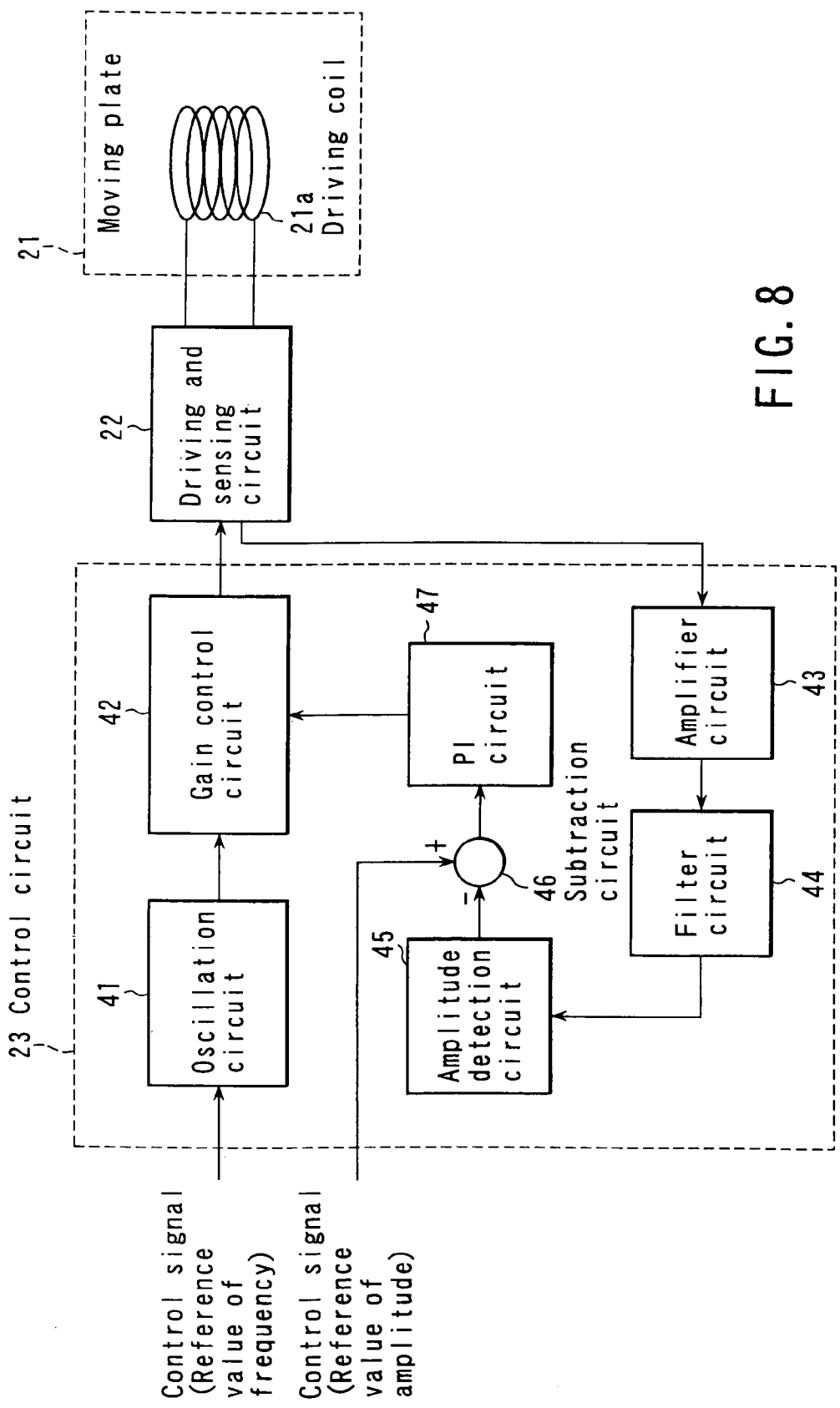
FIG. 8 is a schematic circuit diagram of a control circuit used for the first embodiment.

FIG. 8 shows a configuration example of the control circuit 23 according to the first embodiment. Referring to FIG. 8, an operation controller such as a personal computer (not shown) supplies the oscillation circuit 41 with a frequency reference value as a control signal. Then, the oscillation circuit 41 generates a sinusoidal wave signal having a predetermined amplitude according to the frequency specified in the frequency reference value. The oscillation circuit 41 is connected to a gain control circuit 42. The gain control circuit 42 controls (regulates) the amplitude of the sinusoidal wave signal output from the oscillation circuit 41 according to the output of a PI circuit 47, which will be described in more detail hereinafter. Then, the gain control circuit 42 outputs the sinusoidal signal with the controlled (regulated) amplitude as a driving reference signal to the driving and sensing circuit 22.

The driving and sensing circuit 22 connects with an amplifier circuit 43. The driving and sensing circuit 22 supplies a sensing signal to the amplifier circuit 43. The amplifier circuit 43 amplifies the amplitude of the input sensing signal by a predetermined factor.

The amplifier circuit 43 is connected to a filter circuit 44. The filter circuit 44 comprises a band pass filter for extracting only a vibration frequency component (the frequency component specified in the frequency reference value). The filter circuit 44 eliminates a noise component in the output supplied from the amplifier circuit 43. While it is most desirable that the filter circuit 44 comprises a band pass filter, there may be provided a low pass filter and a band-pass filter depending on noise situations. According to cases, filter circuits may be omitted. It may be also preferable to invert the connecting relation between the amplifier circuit 43 and the filter circuit 44.

The filter circuit 44 is connected to an amplitude detection circuit 45. The amplitude detection circuit 45 detects an amplitude value (or an RMS value) of the sensing signal whose noise component has been eliminated by the filter circuit 44. The amplitude detection circuit 45 then outputs the detected value to a subtraction circuit 46. The subtraction circuit 46 determines a deviation of the sensing signal amplitude from the amplitude reference value supplied as a control signal from the operation controller (not shown).

The subtraction circuit 46 is connected to the PI circuit 47. The PI circuit comprises an I circuit (integration circuit) and a P circuit (proportional circuit). The PI circuit 47 amplifies a difference signal from the subtraction circuit 46 according to the frequency component by a predetermined gain. Then, the PI circuit 47 supplies the amplified difference signal (to be referred to as a "control signal" hereinafter) to the gain control circuit 42. The gain control circuit 42 controls the amplitude of the driving signal by means of the control signal from the PI circuit 47. Consequently, a combination of the gain control circuit 42 and the PI circuit 47 may be referred to as an "amplitude control section" hereinafter.

Now, the operation of the above arrangement will be described below.

While the moving plate 21 is in a non-vibrating state (to be referred to as an "initial state" hereinafter), the operation controller such as a personal computer (not shown) may supply the oscillation circuit 41 with a frequency reference value (to be assumed as a "resonance frequency" here) as a control signal. In this case, the oscillation circuit 41 generates a driving signal. The driving signal is fed to the driving coil 21a of the moving plate 21 via the gain control circuit 42 and the driving and sensing circuit 22.

In the initial state, the driving and sensing circuit 22 outputs a zero sensing signal to the amplifier circuit 43. When the operation controller such as a personal computer (not shown) supplies the subtraction circuit 46 with an amplitude reference value as a control signal in the initial state, the deviation obtained by the subtraction circuit 46 becomes a maximum value. As a result, a large control signal is output from the PI circuit 47. Then, the gain control circuit 42 controls the driving signal so as to increase the amplitude of the driving signal.

As a result, the moving plate 21 starts vibrating with the resonance frequency.

Thereafter, the amplitude control section controls the driving signal so as to increase the driving signal amplitude until the deviation produced by the subtraction circuit 46 becomes zero relative to the amplitude reference value. As the vibration amplitude of the moving plate 21 becomes sufficiently large, the sensing signal from the driving and sensing circuit 22 increases. When the output (difference signal) of the subtraction circuit 46 becomes zero, the amplitude control section controls the driving signal so as to maintain the driving signal amplitude. If the deviation produced by the subtraction circuit 46 becomes negative relative to the amplitude reference value, the amplitude control section controls the driving signal so as to reduce the amplitude of the driving signal.

In this way, the amplitude control section controls so as to always keep the vibration amplitude of the moving plate 21 at a value that corresponds to the amplitude reference value.

According to the above described first embodiment, the driving coil 21a of the moving plate 21 links with the magnetic field of the magnets to induce the electromotive force. The induced electromotive force is extracted as a sensing signal. The extracted sensing signal is monitored by the control circuit 23. When the vibration amplitude of the moving plate 21 deviates from the vibration reference value, the driving signal output to the driving and sensing circuit 22 is corrected. As a result, the moving plate 21 can be controlled so that the vibration amplitude thereof is kept at a predetermined value. Therefore, the vibration amplitude of the moving plate 21 can be controlled highly accurately without providing the optical scanner with a sensing coil or an additional sensing circuit as conventionally practiced.

SECOND EMBODIMENT

Figure 9:
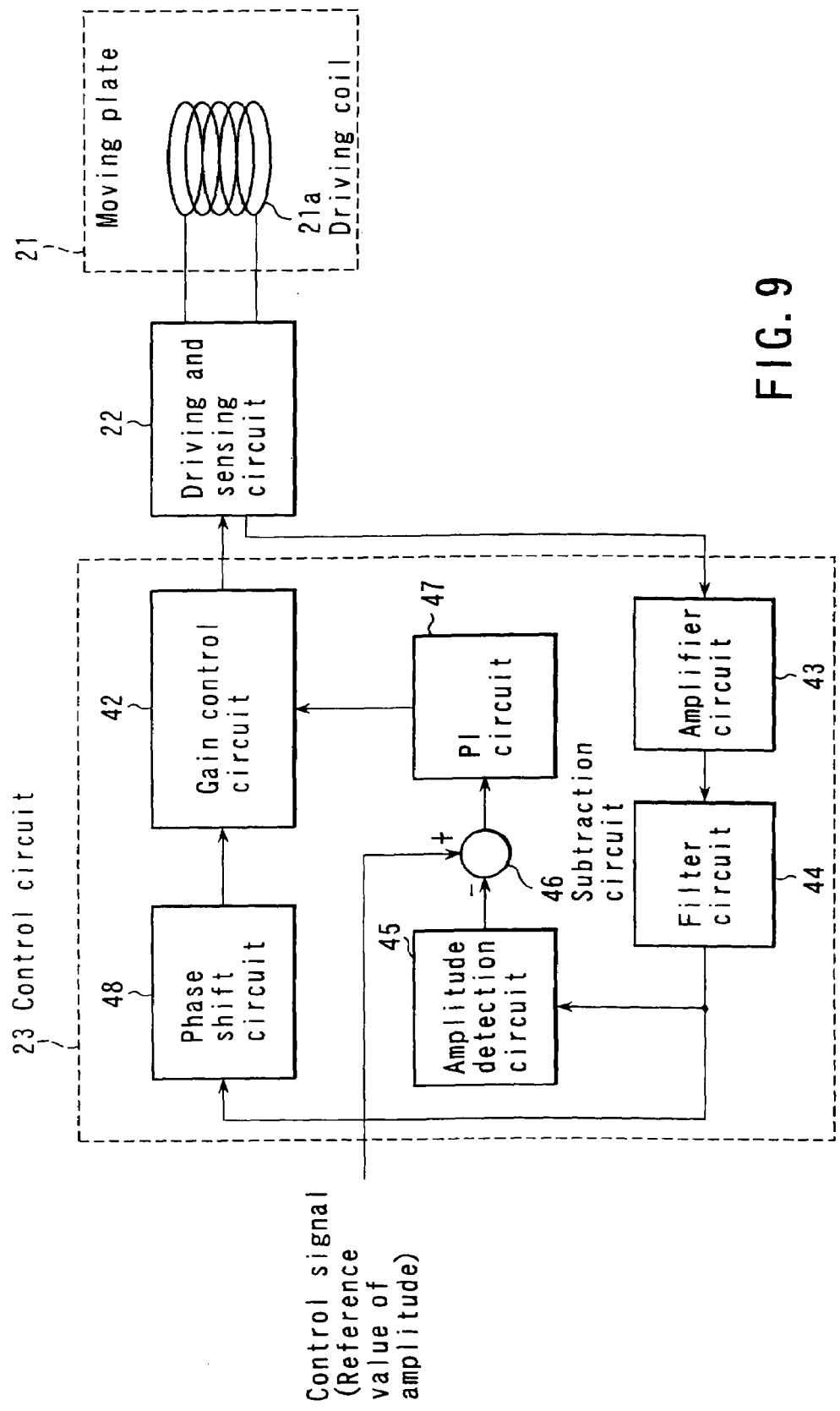
FIG. 9 is a schematic circuit diagram of a control circuit used for a second embodiment of the present invention.

FIG. 9 outlines a configuration of the control circuit 23 that can be used for the second embodiment of the present invention. The mutually corresponding parts in FIGS. 9 and 8 are designated by the same reference numerals and a detailed description will be omitted for simplicity. Since the moving plate of the second embodiment is identical with that of the first embodiment, it will not be illustrated nor described here.

Referring to FIG. 9, the control circuit 23 comprises a phase shift circuit 48 instead of the oscillation circuit 41. The phase shift circuit 48 is connected between the output terminal of the filter circuit 44 and the input terminal of the gain control circuit 42. The phase shift circuit 48 regulates phases so that the phase of the driving signal output from the gain control circuit 42 agrees with that of the sensing signal supplied to the amplifier circuit 43 (oscillation based on the resonance frequency provides a match between the phases of the driving signal and the sensing signal). In other words, the phase shift circuit 48 regulates the phase of the output signal from the filter circuit 44 and supplies a result to the gain control circuit 42. The extent of phase regulation by the phase shift circuit 48 depends on a phase displacement that is produced as signals pass through the amplifier circuit 43, the filter circuit 44 and the gain control circuit 42.

The control circuit 23 according to the second embodiment is always provided with positive feedback. More specifically, in the initial state, a loop gain becomes greater than or equal to 1 and the oscillation starts by the amplitude control section. The moving plate 21 vibrates with the resonance frequency. Like the first embodiment, the amplitude control section also controls the vibration amplitude. Namely, the amplitude control section controls the vibration frequency of the moving plate 21 so as to follow the mechanical resonance frequency. Additionally, the amplitude control section controls the vibration amplitude of the moving plate 21 so as to maintain a predetermined value.

As described above, like the first embodiment, the second embodiment can also highly accurately control frequencies of the moving plate without the need for any external sensor.

Additional advantages and modifications will readily occur to those skilled in the art. Therefore, the present invention in its broader aspects is not limited to the specific details and representative devices, and illustrated examples shown and described herein. Accordingly, various modifications may be made without departing from the spirit or scope of the general inventive concept as defined by the appended claims and their equivalents.

What is claimed is:

1. An optical scanner driving apparatus comprising:
   a moving plate having a reflection plane and comprising a driving coil integrally formed therewith;
   a magnetic field generating section arranged in a vicinity of said moving plate;
   a driving circuit configured to supply a driving signal to said driving coil, said moving plate performing a torsional vibration by said driving signal;
   first output acquiring means for acquiring an output containing an electromotive force generated in said driving coil by an electromagnetic induction on the basis of the magnetic field generated by said magnetic field generating section and the torsional vibration of said driving coil;
   second output acquiring means comprising an impedance element having a corresponding impedance to an impedance of said driving coil, for acquiring an output generated by said impedance element by supplying said driving signal to said impedance element; and
   a control section configured to control a state of the torsional vibration of said moving plate according to the electromotive force generated in said driving coil on the basis of the output acquired by said first output acquiring means and the output acquired by said second output acquiring means.

2. The apparatus according to claim 1, further comprising:
   a support member which supports said moving plate; and
   an elastic member which connects said moving plate with said support.

3. The apparatus according to claim 1, further comprising:
   a differential amplifier configured to receive an output of said first output acquiring means and an output of said second output acquiring means, obtain a difference therebetween and output a difference to said control circuit.

4. The apparatus according to claim 1, wherein said control section controls the vibration amplitude of said moving plate according to the difference between an externally given amplitude reference value and an amplitude of said electromotive force.

5. The apparatus according to claim 1, wherein said control section includes a PI circuit configured to amplify a difference between an amplitude reference value and an amplitude of said electromotive force, and a gain control circuit configured to control a vibration amplitude of said moving plate according to an amplified difference output from said PI circuit.

6. The apparatus according to claim 1, wherein said control section includes a phase shift circuit configured to coincide a phase of the driving signal supplied to said driving coil with a phase of said electromotive force.

7. An optical scanner driving apparatus comprising:
   an optical scanner comprising a moving plate having a reflection plane and comprising a driving coil integrally formed therewith, a support member configured to support said moving plate, an elastic member configured to connect said moving plate and said support member, and a magnetic field generating section arranged in a vicinity of said moving plate;
   a driving circuit configured to supply a driving signal to said driving coil, said moving plate performing a torsional vibration according to said driving signal;
   first output acquiring means for acquiring an output containing an electromotive force generated in said driving coil by an electromagnetic induction on the basis of the magnetic field generated by said magnetic field generating section and the torsional vibration of said driving coil;
   second output acquiring means comprising an impedance element having a corresponding impedance to an impedance of said driving coil, for acquiring an output generated by said impedance element by supplying said driving signal to said impedance element; and control means for controlling a state of the torsional vibration of said moving plate according to the electromotive force generated in said driving coil on the basis of the output acquired by said first output acquiring means and the output acquired by said second output acquiring means.

8. The apparatus according to claim 7, wherein said control means controls the vibration amplitude of said moving plate according to the difference between an exter-nally given amplitude reference value and an amplitude of said electromotive force.

9. The apparatus according to claim 7, wherein said control means controls a vibration frequency of said moving plate by a phase shift control which coincides a phase of the driving signal supplied to said driving coil with a phase of said electromotive force.

* * * * *